(12) United States Patent
Agarwala et al.

(10) Patent No.: US 9,432,300 B2
(45) Date of Patent: Aug. 30, 2016

(54) ALLOCATION OF STORAGE RESOURCES IN A NETWORKED COMPUTING ENVIRONMENT BASED ON ENERGY UTILIZATION

(71) Applicant: International Business Machines Corporation, Armonk, NY (US)

(72) Inventors: Sandip Agarwala, Cupertino, CA (US); Eric K. Butler, San Jose, CA (US); Kavita Chavda, Roswell, GA (US); Sandeep Gopisetty, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 628 days.

(21) Appl. No.: 13/845,332

(22) Filed: Mar. 18, 2013

(65) Prior Publication Data

US 2014/0129717 A1    May 8, 2014

Related U.S. Application Data

(63) Continuation of application No. 13/073,081, filed on Mar. 28, 2011, now Pat. No. 8,407,501.

(51) Int. Cl.
*G06F 1/00* (2006.01)
*G06F 1/32* (2006.01)
(Continued)

(52) U.S. Cl.
CPC .............. *H04L 47/70* (2013.01); *G06F 3/067* (2013.01); *G06F 3/0625* (2013.01); *G06F 3/0635* (2013.01); *Y02B 60/1246* (2013.01)

(58) Field of Classification Search
CPC ....... H04L 47/70; G06F 3/0625; G06F 3/067

USPC .......................................................... 713/320
See application file for complete search history.

(56) References Cited

U.S. PATENT DOCUMENTS 7,574,496 B2    8/2009  McCrory et al.
2007/0288783 A1  12/2007  Ogasawara et al.
(Continued)

OTHER PUBLICATIONS

Maitland, J., "Keeping Control Isn't Easy", Chapter 4: Cloud-Based Infrastructure, SearchCloudComputing.com, Publication Date: Oct. 2009, 17 pages.

(Continued)

*Primary Examiner* — Robert Cassity
(74) *Attorney, Agent, or Firm* — Noah A. Sharkan; Maxine L. Barasch; Keohane & D'Alessandro PLLC

(57) ABSTRACT

The present invention provides an approach to provision storage resources (e.g., across an enterprise storage system) for different workloads in an energy efficient manner. Typically, energy consumption characteristics for handling a particular storage workload will be determined. Thereafter, a type of storage device capable of handling the workload will be determined. Then, an allocation plan that results in the most efficient energy consumption for handling the workload will be developed. The allocation plan is based upon the energy consumption characteristics and an energy efficiency algorithm. The energy efficiency algorithm serves to identify storage device(s) that can handle the workload in such a way as to reduce total energy consumption and, accordingly, costs. The energy efficiency algorithm may also consider other factors such as capacity and load of storage devices and service level agreement (SLA) terms. At least one storage device can then be selected for handling the storage workload.

22 Claims, 6 Drawing Sheets

(51) Int. Cl.
*H04L 12/911* (2013.01)
*G06F 3/06* (2006.01)

(56) References Cited

U.S. PATENT DOCUMENTS

| | | | |
|---|---|---|---|
| 2009/0177756 A1* | 7/2009 | Gunda et al. | 709/216 |
| 2010/0042720 A1 | 2/2010 | Stienhans et al. | |
| 2010/0076856 A1 | 3/2010 | Mullins | |
| 2010/0088150 A1 | 4/2010 | Mazhar et al. | |
| 2010/0115216 A1* | 5/2010 | Jia et al. | 711/162 |
| 2010/0125473 A1 | 5/2010 | Tung et al. | |
| 2010/0235355 A1 | 9/2010 | Carter et al. | |
| 2010/0332262 A1 | 12/2010 | Horvitz et al. | |
| 2010/0332401 A1 | 12/2010 | Prahlad et al. | |
| 2010/0332818 A1 | 12/2010 | Prahlad et al. | |
| 2010/0333116 A1 | 12/2010 | Prahlad et al. | |
| 2011/0016214 A1 | 1/2011 | Jackson | |
| 2011/0238672 A1* | 9/2011 | Agarwala et al. | 707/748 |

OTHER PUBLICATIONS

Manzanares, A. et al., "Energy Efficient Prefetching with Buffer Disks for Cluster File Systems", http://doi.iiecputersociety.org, 2010 39th International Conference on Parallel Processing. San Diego, California, Sep. 13-16, 1 page.

Papathanasiou, A. et al., "Energy Efficient Prefetching and Caching", (2004), 14 pages. http:'www.cs.rochester.edu.

Ruan, X. et al., "ECOS: An Energy-Efficient Cluster Storage System", Performance Computing and Communications Conference (IPCCC), 2009 IEEE 28th International Computer Science & Software Eng., Auburn University, Auburn, Alabama, Dec. 14-16, 2009, 1 Page. http://ieeexploe.ieee.org.

Zhu, Q. et al., "Reducing Energy Consumption of Disk Storage Using Power-Aware Cache Management", HPCA (2004), 12 pages.

Ganesh, L. et al., "Optimizing Power Consumption in Large Scale Storage Systems", Computer Science Department, Cornell University (2007), 6 pages.

Colarelli, D. et al., "Massive Arrays of Idle Disks for Storage Archives", Department of Computer Science, University of Colorado, Jul. 26, 2002, 11 pages.

Narayanan, D. et al., "Write Off-Loading: Practical Power Management for Enterprise Storage", Microsoft Research Ltd. (2008), 15 pages.

Iglesias, J., "Green IT: Start Saving Money", Symantec Applied Performance Survey, Confidence in a Connected World, Mar. 2009, 28 pages.

Mearian, L., "Symantec to Release End-to-End Cloud Management Software", Computer World NEC, Mar. 16, 2011, 4 pages.

Maitland, J., "Keeping Control Isn't Easy", Chapter 4: Cloud-Based Infrastructure, SearchCloudComputing.com, 13 pages.

Mell et al., "The NIST Definition of Cloud Computing", National Institute of Standards and Technology, Information Technology Laboratory, Version 15, Oct. 7, 2009, 2 pages.

Clifford H. Knoll, USPTO Notice of Allowance and Fee(s) Due, U.S. Appl. No. 13/073,081, Date Mailed Nov. 23, 2012, 11 pages.

* cited by examiner

ALLOCATION OF STORAGE RESOURCES IN A NETWORKED COMPUTING ENVIRONMENT BASED ON ENERGY UTILIZATION

RELATED U.S. APPLICATION DATA

The present patent document is a continuation of U.S. patent application Ser. No. 13/073,081, filed Mar. 28, 2011, entitled "ALLOCATION OF STORAGE RESOURCES IN A NETWORKED COMPUTING ENVIRONMENT BASED ON ENERGY UTILIZATION". The disclosure of U.S. patent application Ser. No. 13/073,081 is incorporated herein by reference.

TECHNICAL FIELD

The present invention generally relates to allocation of storage resources based on energy utilization. Specifically, the present invention relates to the provision of storage resources for different workloads in an energy efficient manner in a networked computing environment (e.g., in a cloud computing environment).

BACKGROUND

The cloud computing environment is an enhancement to the predecessor grid environment, whereby multiple grids and other computation resources may be further abstracted by a cloud layer, thus making disparate devices appear to an end-consumer as a single pool of seamless resources. These resources may include such things as physical or logical computing engines, servers and devices, device memory, and storage devices.

Energy consumption is becoming a growing concern for enterprise storage clouds. Specifically, as workloads are added to a storage cloud, the corresponding power/energy consumption goes up, which can drive up operational costs. Different workloads have different characteristics that may be defined in terms of Input/Output (I/O) per second, cache hit rate, read-write ratio, random-sequential ratio, etc. In addition to the type and configuration of underlying storage resources, these workload parameters also influence the amount of energy consumed by the corresponding workloads. Ad-hoc allocation of storage resources may result in inefficient resource utilization as well as higher energy consumption.

SUMMARY

Embodiments of the present invention provide an approach to provision storage resources (e.g., across an enterprise storage system (ESS) such as a general parallel file system (GPFS) or the like) for different workloads in an energy efficient manner. The system evaluates different energy profiles/workloads' energy consumption characteristics of storage devices to determine an allocation plan that reduces the energy cost (e.g., results in the lowest cost/energy consumption for handling a storage workload). In a typical embodiment, energy consumption characteristics for handling a particular storage workload will be determined. Thereafter, a type of storage device capable of handling the workload will be determined. Then, an allocation plan that results in the most efficient energy consumption for handling the workload will be developed. In general, the allocation plan is based upon the energy consumption characteristics and an energy efficiency algorithm. The energy efficiency algorithm serves to identify storage device(s) that can handle the workload in such a way as to reduce total energy consumption and, accordingly, costs. Along these lines, the energy efficiency algorithm may also consider other factors such as capacity and load of storage devices and service level agreement (SLA) terms in addition to energy costs (e.g., over times of day and/or days of week). In any event, at least one storage device can then be selected for handling the storage workload according to the allocation plan.

A first aspect of the present invention provides a method for energy efficient allocation of storage resources in a networked computing environment, comprising: determining energy consumption characteristics of a storage workload in the networked computing environment; selecting a type of storage device for handling the storage workload; developing an allocation plan to result in a most efficient energy consumption for handling the workload, the allocation plan being based upon the energy consumption characteristics, a set of device models for a set of storage devices having the type, and an energy efficiency algorithm; and selecting at least one storage device from the set of storage devices for handling the storage workload according to the allocation plan.

A second aspect of the present invention provides a system for energy efficient allocation of storage resources in a networked computing environment, comprising: a bus; a processor coupled to the bus; and a memory medium coupled to the bus, the memory medium comprising instructions to: determine energy consumption characteristics of a storage workload in the networked computing environment; select a type of storage device for handling the storage workload; develop an allocation plan to result in a most efficient energy consumption for handling the workload, the allocation plan being based upon the energy consumption characteristics, a set of device models for a set of storage devices having the type, and an energy efficiency algorithm; and select at least one storage device from the set of storage devices for handling the storage workload according to the allocation plan.

A third aspect of the present invention provides a computer program product for energy efficient allocation of storage resources in a networked computing environment, the computer program product comprising: a computer readable storage media, and program instructions stored on the computer readable storage media, to: determine energy consumption characteristics of a storage workload in the networked computing environment; select a type of storage device for handling the storage workload; develop an allocation plan to result in a most efficient energy consumption for handling the workload, the allocation plan being based upon the energy consumption characteristics, a set of device models for a set of storage devices having the type, and an energy efficiency algorithm; and select at least one storage device from the set of storage devices for handling the storage workload according to the allocation plan.

A fourth aspect of the present invention provides a method for deploying a system for energy efficient allocation of storage resources in a networked computing environment, comprising: deploying a computer infrastructure being operable to: determine energy consumption characteristics of a storage workload in the networked computing environment; select a type of storage device for handling the storage workload; develop an allocation plan to result in a most efficient energy consumption for handling the workload, the allocation plan being based upon the energy consumption characteristics, a set of device models for a set of storage devices having the type, and an energy efficiency algorithm;

and select at least one storage device from the set of storage devices for handling the storage workload according to the allocation plan.

BRIEF DESCRIPTION OF THE DRAWINGS

These and other features of this invention will be more readily understood from the following detailed description of the various aspects of the invention taken in conjunction with the accompanying drawings in which.

Figure 1:
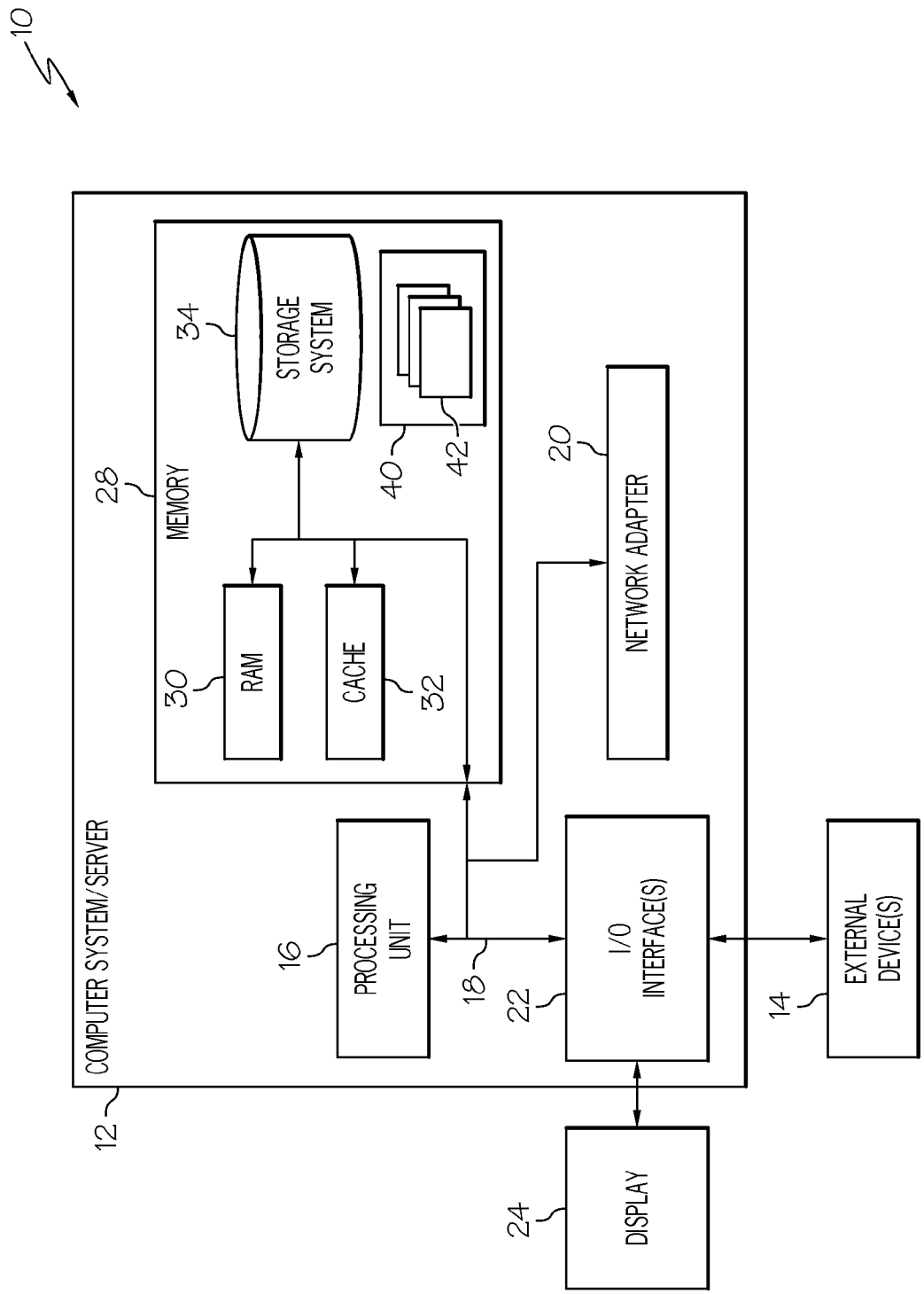
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments now will be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Enterprise storage clouds are typically comprised of a large number of interconnected components such as servers, switches, raid arrays, disks, etc. Over a period of time, some of these components may become a performance bottleneck. This may be due to change in workload, system misconfigurations, component failure, etc. A component causing energy inefficiency may deteriorate cloud performance, reduce availability, or result in service level agreement (SLA) violation. These may further lead to loss in revenue, customer dissatisfaction, etc.

Embodiments of the present invention provide an approach to provision storage resources (e.g., across an enterprise storage system (ESS) such as a general parallel file system (GPFS) or the like) for different workloads in an energy efficient manner. The system evaluates different energy profiles/workloads' energy consumption characteristics of storage devices to determine an allocation plan that reduces the energy cost (e.g., results in the lowest cost/energy consumption for handling a storage workload). In a typical embodiment, energy consumption characteristics for handling a particular storage workload will be determined. Thereafter, a type of storage device capable of handling the workload will be determined. Then, an allocation plan that results in the most efficient energy consumption for handling the workload will be developed. In general, the allocation plan is based upon the energy consumption characteristics and an energy efficiency algorithm. The energy efficiency algorithm serves to identify storage device(s) that can handle the workload in such a way as to reduce total energy consumption and, accordingly, costs. Along these lines, the energy efficiency algorithm may also consider other factors such as capacity and load of storage devices and service level agreement (SLA) terms in addition to energy costs (e.g., over times of day and/or days of week). In any event, at least one storage device can then be selected for handling the storage workload according to the allocation plan.

It is further understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
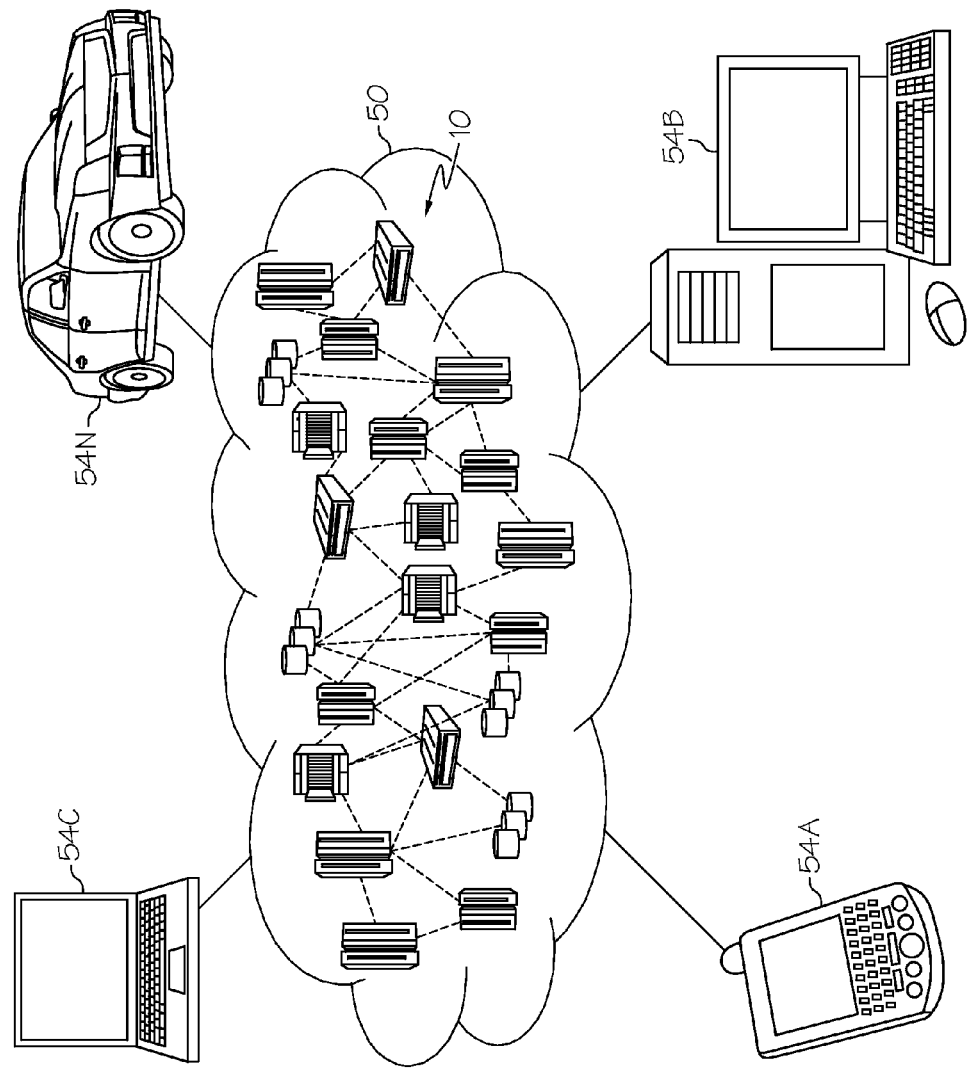
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
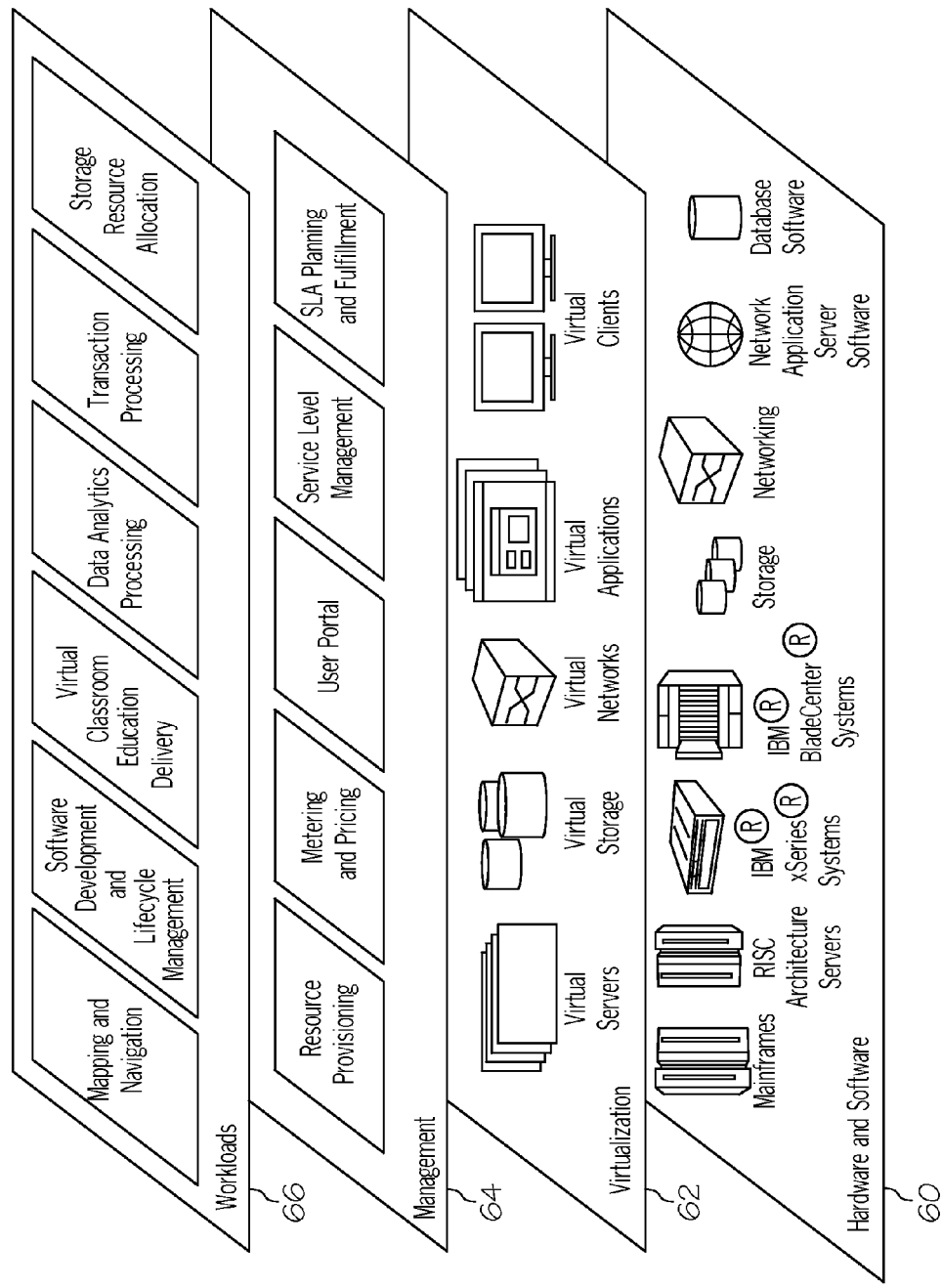
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only, and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and storage resource allocation. As mentioned above, all of the foregoing examples described with respect to FIG. 3 are illustrative only, and the invention is not limited to these examples.

It is understood all that functions of the present invention as described herein typically may be performed by the storage resource allocation functionality, which can be tangibly embodied as modules of program code 42 of program/utility 40 (FIG. 1). However, this need not be the case.

Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

In general, enterprise datacenters are facing serious challenges to cope with the exponential growth of storage and computing needs. These challenges include cost, performance, and resiliency, among other things. Architectures such as cloud computing environments are being proposed, which address some of the challenges (e.g., management issues). However, some of the issues still remain. One of those challenges is the increase in energy consumption requirements. System administrators not only have to manage performance, resiliency, and other workload requirements, but also the needs of energy-consuming servers, storage, and networking equipments. As more workloads are consolidated in large cloud computing environments, the need for additional energy is also growing. These consolidated environments should be designed to accommodate peak energy and cooling requirements. Failure to do so may result in system failure and/or application downtime, both of which may cause data and revenue loss, missed opportunities, and loss of goodwill. Energy consumed by a particular application and workload depends not only on their I/O and computational characteristics, but also on the type and configuration of the resources they use. Arbitrary allocation and configuration of cloud resources may result in higher energy consumption and may exceed the total energy budget allocated for a particular cloud installation.

Storage cloud services can be built on top of shared networked infrastructure(s) with the ability to scale to vast quantities of storage and an astronomical number of I/O transactions per second with low cost and high reliability. These storage services are typically made available in the form of web services API(s) or traditional file system-based interfaces. As indicated, embodiments of the present invention provide an approach for allocating storage (e.g., handling a storage workload) in an enterprise storage system (ESS) such as a general parallel file system (GPFS). It is understood that although a GPFS is used herein as an example, the same concepts could be applied to any type of ESS.

In general, a GPFS is based on a shared disk architecture, where the file system data is striped across multiple storage units called network shared disks (NSDs). These NSDs are typically created out of storage logical units (LUNs) that may physically reside in one or more storage subsystem(s). Storage LUNs are typically created out of redundant arrays of independent disks (e.g., a RAID-based storage pool having multiple storage disks). Data stored in a LUN is potentially spread across several disks in the storage pool. This sharing and distribution can be beneficial for performance and fault tolerance, but it can have a negative impact on the energy consumption of the workloads. This is because the distribution of a file system workload across multiple NSDs/LUNs causes all the disks that constitute those LUNs to remain in an active state (e.g., "spinning"). Also, different types of disks (e.g., serial-attached small computer system interface (SAS), serial advanced technology attachment (SATA), solid state drives (SSDs), etc.) consume different amounts of energy and have different performance and reliability characteristics. The approach recited herein provides automated selection of NSDs/LUNs for a given file system workload while optimizing energy and other workload requirements.

Figure 4:
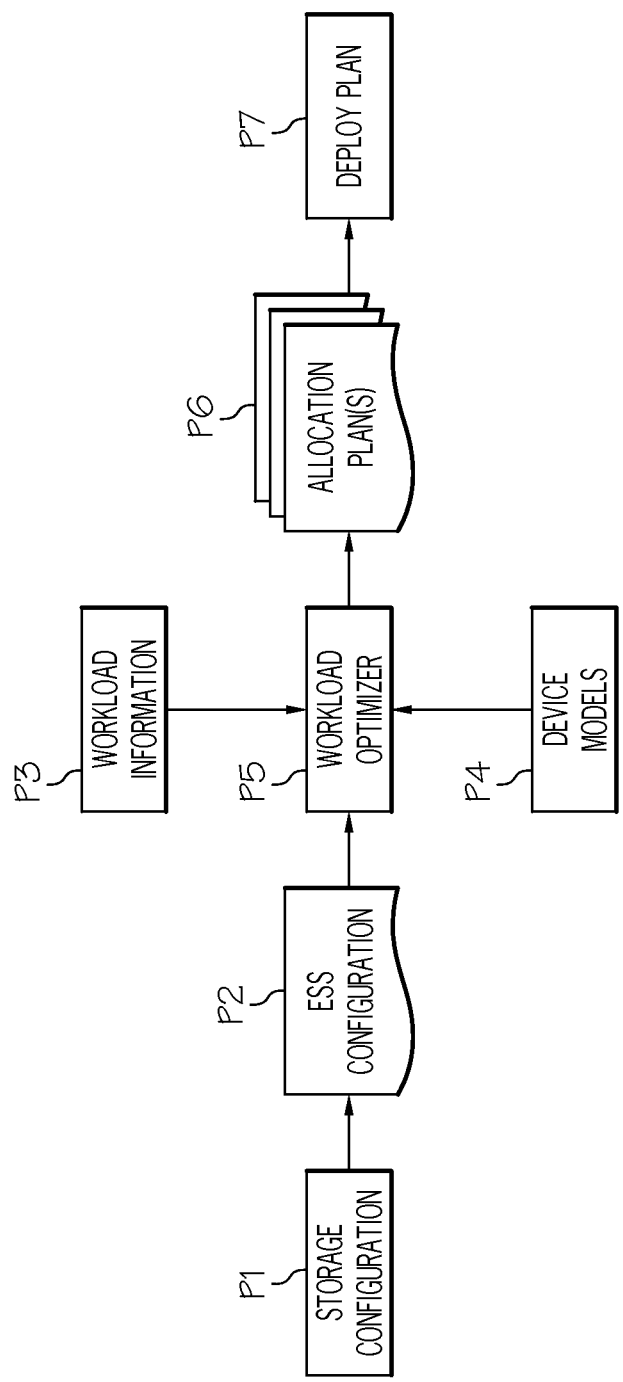
FIG. 4 depicts a process flow diagram according to an embodiment of the present invention.

Referring now to FIG. 4, a process flow diagram according to the an embodiment present invention is shown. As depicted, in steps P1 and P2, a storage configuration is determined/discovered. Specifically, storage resources/components/devices of an ESS (e.g., GPFS 70 of FIG. 5), their configurations and interrelationships are determined. Briefly referring to FIG. 5, such resources/components/devices can include RAID pools 80A-N that can be coupled to LUNs 78A-N. As further shown, LUNs 78A-N can be coupled to NSDs 76A-N of clusters 74A-N (e.g., GPFS clusters). In any event, referring back to FIG. 4, the configuration information is fed to workload optimizer (e.g., which can be embodied as program/utility 40 of FIG. 1, and which enables storage resource allocation functionality in workloads layer 66 of FIG. 3) in step P5. Also received by workload optimizer P5 are workload characteristics/information (e.g., energy consumption characteristics involved with handling/servicing a given storage workload) in step P3, and device models in step P4. The device models indicate an energy consumption rate/information about the resources/components/devices in the discovered ESS. Such information can also include a current load on each component/resource, a capacity of each component/resource, and a rate at which each resource/component/device consumes energy under a given load and/or available capacity.

Based on the received information (e.g., storage configuration, workload characteristics, device models, etc.), the workload optimizer will apply an energy efficiency algorithm to develop an allocation plan P6 for handling the storage workload. Along these lines, the allocation plan includes instructions for allocating the storage workload so that the level of energy needed to handle the storage workload can be provided so as to result in the most efficient energy consumption/cost. For example, the allocation plan can call for using a set (at least one) of storage devices of a certain type in a certain manner (e.g., in a certain order, to a certain load, etc.). The energy efficiency algorithm is typically based on the capacity of a set of storage devices, a load on each of the set of storage devices, and an energy consumption of the set of storage devices as derived from the set of device models. As such the workload optimizer could, in a typical embodiment, determine what type of storage device(s) should be used to handle the workload, and then determine what specific instances of devices having those type(s) should be used to accommodate the workload. The allocation plan would further be generated to utilize these devices in the most energy efficient manner. As such, the workload optimizer will balance multiple factors such as handling the storage workload and doing so in a way that results in the most efficient energy consumption/cost (e.g., while still honoring any other factors such as service level agreement (SLA) terms or the like). In any event, in step P7, the allocation plan will be deployed and the storage workload handled accordingly.

As indicated above, the workload optimizer can select a type of storage device to handle a given storage workload. The selection of the device type can be primarily governed by workload performance and resiliency requirements. For "mission critical" data with high performance and reliability requirements, SAS is the preferred disk type, SSD is recommended for workloads with high random I/O, SATA is preferred for redundant data like logs, etc. The system of the embodiments of the present invention uses these policies and best practices to choose between different disk types.

Once the device type is selected, the energy efficiency algorithm will be used to select the actual NSDs for file system creation. Since more disk activities result in higher energy consumption, the algorithm can select NSDs such that total activity (or entropy) of the underlying disks that form the NSDs is minimized. Furthermore, the algorithm can minimize server-level energy consumption by consolidating workloads on fewer storage nodes.

In general, the energy efficiency algorithm can be developed as follows:
Let $1_{Ni}^z$ denotes the existing load on NSD (or LUN) $N_i$.
Let $1_{Dj}^s$ denotes the existing load on physical disk $D_i$.
Let $C_D^r$ be the total number of existing active disks
Therefore, total existing load on the disks:

$$L_D^s = \sum_j^{List\ of\ disks} l_{Dj}^s$$

Similarly, for provisioning the new workload 'n',
Let $1_{Ni}^n$ denotes the new load on NSD (or LUN) $N_i$.
Let denotes the new load on physical disk
Let $C_D^n$ be the total number of active disks after adding the new workload
Therefore, total load on the disks after adding the new workload is:

$$L_D = \sum_j^{Lists\ of\ disks} (l_{Dj}^s + l_{Dj}^n)$$

For minimizing energy consumption, the optimization algorithm selects NSDs and storage servers such that the following constraints are satisfied:
$1_{Dj}^z + 1_{dj}^n < C_{nj(i)}$, where $C_{nj}$ is the performance capacity of disk $D_i$.
(ii) Minimize $L_D$, i.e. Minimize $$\sum_j^{Lists\ of\ Disks} (l_{Dj}^s + l_{Dj}^n)$$

(iii) Minimize $C_D^n$
(iv) Minimize active storage server set.

Figure 5:
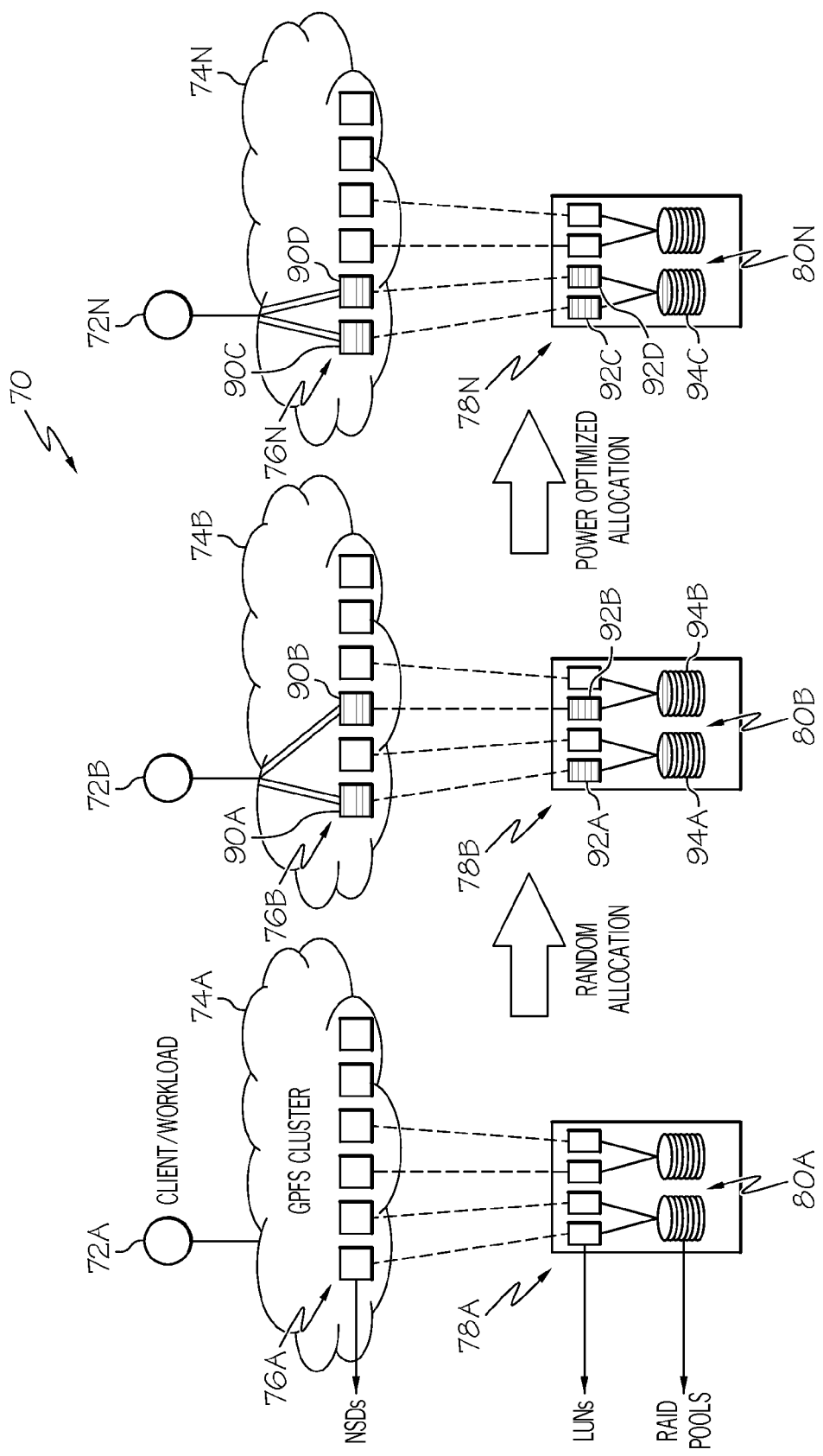
FIG. 5 depicts an enterprise storage system (ESS) according to an embodiment of the present invention.

An example of the application of the teachings recited herein is shown in FIG. 5. As indicated above, FIG. 5 depicts a GPFS 70 comprising clusters 76A-N of NSDs 76A-N, LUNs 78A-N, and RAID pools 80A-N. IN general, clusters 76A-N can receive workloads (e.g., storage workloads) from one or more clients 72A-N. Cluster 76B shows when a storage workload is subject to random allocation among devices. As shown, two different RAID pools 94A-B are utilized, each of which are coupled to a separate LUN 92A-B. As such, two non-adjacent NSDs 90A-B were selected. In contrast, cluster 76N shows selection in accordance with the embodiments of the present invention (e.g., via the energy efficiency algorithm). As shown, one RAID pool 94C is coupled to adjacent LUNS 92C-D, which results in usage of two adjacent NSDs 90C-D.

From FIG. 5, it can be seen that if a file system uses two NSDs 90A-B (or LUNs 92A-B) from two different RAID pools 94A-B, it creates activities in more disks. Selecting LUNs 92C-D from the same RAID pools 94C makes the other RAID pool idle and allows the storage system to switch the latter to low energy state. In a scenario where the first RAID pool does not have sufficient performance capacity available, then a LUN from another RAID pool can be chosen.

Figure 6:
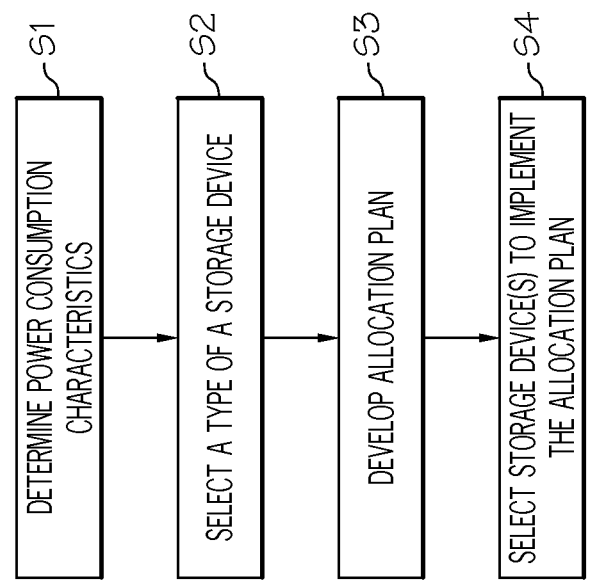
FIG. 6 depicts a method flow diagram according to an embodiment of the present invention.

Referring now to FIG. 6, a method flow diagram according to an embodiment of the present invention is shown. As depicted, in step S1, energy consumption characteristics of a storage workload are determined. In step S2, a type of storage device for handling the storage workload is selected. In step S3, an allocation plan is developed to result in the most efficient energy consumption for handling the workload. As mentioned above, the allocation plan is typically based upon the energy consumption characteristics, a set of device models for a set of storage devices having the particular type selected, and an energy efficiency algorithm. In step S4, at least one storage device is selected from the set of storage devices for handling the storage workload according to the allocation plan.

While shown and described herein as a storage resource allocation solution, it is understood that the invention further provides various alternative embodiments. For example, in one embodiment, the invention provides a computer-readable/useable medium that includes computer program code to enable a computer infrastructure to provide storage resource allocation functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide storage resource allocation functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for storage resource allocation. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for energy efficient allocation of storage resources in a networked computing environment, comprising:
    determining energy consumption characteristics of a storage workload in the networked computing environment;
    selecting a type of storage device for handling the storage workload;
    developing an allocation plan to result in a most efficient energy consumption for handling the workload, the allocation plan being based upon the energy consumption characteristics, a set of device models for a set of storage devices having the type, and an energy efficiency algorithm, the energy efficiency algorithm comprising applying a set of rules comprising:
        assigning critical data having high performance and reliability requirements to a serial attached small computer system interface disk;
        assigning workloads with high random input/output to an solid state drive; and
        assigning redundant data to a serial AT attachment;
    deploying the allocation plan; and
    selecting at least one storage device from the set of storage devices for handling the storage workload according to the deployed allocation plan.

2. The method of claim 1, the networked computing environment comprising a cloud computing environment.

3. The method of claim 2, the at least one storage device comprising a network shared disk (NSD) within a general parallel file system (GFPS).

4. The method of claim 2, the at least one storage device comprising a plurality of NSDs associated with a plurality of redundant arrays of independent disks (RAIDs).

5. The method of claim 1, the energy efficiency algorithm being based on a capacity of a set of storage devices having the type, a load on each of the set of storage devices, and an energy consumption of the set of storage devices as derived from the set of device models.

6. The method of claim 1, further comprising handling the storage workload according to the allocation plan.

7. The method of claim 1, the energy consumption characteristics indicating a level of energy that will be consumed for handling the storage workload, and the allocation plan allocating the storage workload so that the level of energy can be provided at the lowest cost.

8. A system for energy efficient allocation of storage resources in a networked computing environment, comprising:
    a bus;
    a processor coupled to the bus; and
    a memory medium coupled to the bus, the memory medium comprising instructions to:
        determine energy consumption characteristics of a storage workload in the networked computing environment;
        select a type of storage device for handling the storage workload;
        develop an allocation plan to result in a most efficient energy consumption for handling the workload, the allocation plan being based upon the energy consumption characteristics, a set of device models for a set of storage devices having the type, and an energy efficiency algorithm, the energy efficiency algorithm comprising applying a set of rules comprising:
            assigning critical data having high performance and reliability requirements to a serial attached small computer system interface disk;
            assigning workloads with high random input/output to an solid state drive; and
            assigning redundant data to a serial AT attachment;
        deploy the allocation plan; and
        select at least one storage device from the set of storage devices for handling the storage workload according to the deployed allocation plan.

9. The system of claim 8, the networked computing environment comprising a cloud computing environment.

10. The system of claim 9, the at least one storage device comprising a network shared disk (NSD) within a general parallel file system (GFPS).

11. The system of claim 9, the at least one storage device comprising a plurality of NSDs associated with a plurality of redundant arrays of independent disks (RAIDs).

12. The system of claim 8, the energy efficiency algorithm being based on a capacity of a set of storage devices having the type, a load on each of the set of storage devices, and an energy consumption of the set of storage devices as derived from the set of device models.

13. The system of claim 8, the memory medium further comprising instructions to handle the storage workload according to the allocation plan.

14. The system of claim 8, the energy consumption characteristics indicating a level of energy that will be consumed for handling the storage workload, and the allocation plan allocating the storage workload so that the level of energy can be provided at the lowest cost.

15. A computer program product for energy efficient allocation of storage resources in a networked computing environment, the computer program product comprising a computer readable hardware storage device, and program instructions stored on the computer readable hardware storage device, to:
- determine energy consumption characteristics of a storage workload in the networked computing environment;
- select a type of storage device for handling the storage workload;
- develop an allocation plan to result in a most efficient energy consumption for handling the workload, the allocation plan being based upon the energy consumption characteristics, a set of device models for a set of storage devices having the type, and an energy efficiency algorithm, the energy efficiency algorithm comprising applying a set of rules comprising:
  - assigning critical data having high performance and reliability requirements to a serial attached small computer system interface disk;
  - assigning workloads with high random input/output to an solid state drive; and assigning redundant data to a serial AT attachment;
- deploy the allocation plan; and
- select at least one storage device from the set of storage devices for handling the storage workload according to the deployed allocation plan.

16. The computer program product of claim 15, the networked computing environment comprising a cloud computing environment.

17. The computer program product of claim 16, the at least one storage device comprising a network shared disk (NSD) within a general parallel file system (GFPS).

18. The computer program product of claim 16, the at least one storage device comprising a plurality of NSDs associated with a plurality of redundant arrays of independent disks (RAIDs).

19. The computer program product of claim 15, the energy efficiency algorithm being based on a capacity of a set of storage devices having the type, a load on each of the set of storage devices, and an energy consumption of the set of storage devices as derived from the set of device models.

20. The computer program product of claim 15, further comprising program instructions stored on the computer readable hardware storage device to handle the storage workload according to the allocation plan.

21. The computer program product of claim 15, the energy consumption characteristics indicating a level of energy that will be consumed for handling the storage workload, and the allocation plan allocating the storage workload so that the level of energy can be provided at the lowest cost.

22. A method for deploying a system for energy efficient allocation of storage resources in a networked computing environment, comprising:
- deploying a computer infrastructure being operable to:
  - determine energy consumption characteristics of a storage workload in the networked computing environment;
  - select a type of storage device for handling the storage workload;
  - develop an allocation plan to result in a most efficient energy consumption for handling the workload, the allocation plan being based upon the energy consumption characteristics, a set of device models for a set of storage devices having the type, and an energy efficiency algorithm, the energy efficiency algorithm comprising applying a set of rules comprising:
    - assigning critical data having high performance and reliability requirements to a serial attached small computer system interface disk;
    - assigning workloads with high random input/output to an solid state drive; and assigning redundant data to a serial AT attachment;
  - deploy the allocation plan; and
  - select at least one storage device from the set of storage devices for handling the storage workload according to the deployed allocation plan.

* * * * *